(12) United States Patent
Tajima (10) Patent No.: US 9,248,539 B2
(45) Date of Patent: Feb. 2, 2016

(54) MOTOR CONTROL DEVICE FOR IMPLEMENTING POWER FAILURE PROTECTION OF MACHINE TOOL

(71) Applicant: FANUC Corporation, Yamanashi (JP)

(72) Inventor: Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1 day.

(21) Appl. No.: 14/332,804

(22) Filed: Jul. 16, 2014

(65) Prior Publication Data

US 2015/0021060 A1 Jan. 22, 2015

(30) Foreign Application Priority Data

Jul. 17, 2013 (JP) .................. 2013-148443

(51) Int. Cl.
| | |
|---|---|
| B23Q 5/00 | (2006.01) |
| B23Q 15/013 | (2006.01) |
| B23Q 5/10 | (2006.01) |
| B23Q 5/28 | (2006.01) |
| B23Q 5/58 | (2006.01) |
| B23Q 15/08 | (2006.01) |
| H02P 6/00 | (2006.01) |
| H02P 29/02 | (2006.01) |

(52) U.S. Cl.
CPC .............. *B23Q 15/013* (2013.01); *B23Q 5/10* (2013.01); *B23Q 5/28* (2013.01); *B23Q 5/58* (2013.01); *B23Q 15/08* (2013.01); *H02P 6/00* (2013.01); *H02P 29/021* (2013.01)

(58) Field of Classification Search
CPC ......... H02P 3/14; H02P 23/0063; H02P 3/12; H02P 3/18; B23Q 15/013; B23Q 15/08; B23Q 5/10; B23Q 5/28; B23Q 5/58

USPC ................................................. 173/1–7, 11
See application file for complete search history.

(56) References Cited

U.S. PATENT DOCUMENTS

| | | | | | |
|---|---|---|---|---|---|
| 3,906,315 | A | * | 9/1975 | Gotisar | H02P 3/18 318/369 |
| 5,777,450 | A | * | 7/1998 | Kono | G05B 19/406 318/568.11 |
| 8,336,432 | B1 | * | 12/2012 | Butler | B23D 59/001 83/471.3 |
| 2002/0158593 | A1 | * | 10/2002 | Henderson | H02P 3/12 318/375 |
| 2007/0275358 | A1 | * | 11/2007 | Nakanishi | A61H 1/001 434/247 |
| 2007/0293373 | A1 | * | 12/2007 | Nakanishi | A63B 69/04 482/51 |
| 2008/0298784 | A1 | * | 12/2008 | Kastner | G01P 3/44 388/811 |
| 2011/0198103 | A1 | * | 8/2011 | Suzuki | B25F 5/00 173/46 |
| 2013/0098646 | A1 | * | 4/2013 | Funabashi | B25F 5/00 173/2 |

FOREIGN PATENT DOCUMENTS

JP H07-143780 A 6/1995

* cited by examiner

*Primary Examiner* — Robert Long
(74) *Attorney, Agent, or Firm* — Hauptman Ham, LLP (57) ABSTRACT

A control device for a machine tool including a feed shaft motor for driving a feed shaft and a main shaft motor for driving a main shaft is provided with: a determination unit determining whether an operation of the feed shaft motor satisfies a predetermined determination condition; and an excitation command unit outputting an excitation current command to output excitation current larger than excitation current instructed by a master control unit to the main shaft motor, when the determination unit determines that the predetermined determination condition is satisfied.

5 Claims, 5 Drawing Sheets

MOTOR CONTROL DEVICE FOR IMPLEMENTING POWER FAILURE PROTECTION OF MACHINE TOOL

RELATED APPLICATIONS

The present application claims priority to Japanese Application Number 2013-148443, filed Jul. 17, 2013, the disclosure of which is hereby incorporated by reference herein in its entirety.

BACKGROUND OF THE INVENTION

1. Field of the Invention

The present invention relates to a control device for a machine tool including a feed shaft motor for driving a feed shaft and a main shaft motor for driving a main shaft, and more particularly to a control device for a machine tool configured such that AC power supplied from the AC power supply side is converted into DC power to be output, and thereafter, the DC power is converted into AC power for driving a motor so as to supply the AC power to the feed shaft motor and to the main shaft motor for driving.

2. Description of the Related Art

In a machine tool including a feed shaft motor and a main shaft motor, the main shaft motor is used as a driving source for driving a main shaft mounted with a tool (various tools), and the feed shaft motor is used as a driving source for driving a feed shaft configured to move the main shaft or a workpiece to be processed. In the machine tool as described above, in view of control feasibility, AC power input from the three-phase AC power supply side is temporarily converted into DC power, and thereafter, the DC power is further converted into AC power, and the AC power is used for driving a motor provided for each of drive shafts (a main shaft and a feed shaft).

A control device provided in a machine tool is provided with, as a main circuit, a converter converting (rectifying) AC power supplied from the three-phase AC power supply side for outputting DC power, and inverters connected to a DC link (a direct-current link) as the DC side of the converter, and mutually converting power between DC power of the DC link, and AC power as driving electric power or regenerative electric power of a motor. Causing the control device to control AC output from each of the inverters at an intended voltage and at an intended frequency makes it possible to control the speed, the torque of a main shaft motor and a feed shaft motor connected to the AC side of each of the inverters, or the position of a rotor.

Regarding inverters, taking requirements for energy saving into consideration, many inverters are capable of regenerating electric power in order to store regenerative electric power generated at the time of motor deceleration in an electric storage device provided in a DC link for reuse as driving electric power of a motor, or to return the regenerative electric power to the AC power supply side.

On the other hand, regarding a converter, it is often the case that one converter is provided with respect to a plurality of inverters for the purpose of reducing the cost or the installation space of a motor control device in a machine tool. Further, as with the case of the inverters, the converter may also be capable of regenerating electric power, specifically, capable of returning regenerative energy generated at the time of motor deceleration to the AC power supply side, when taking requirements for energy saving into consideration.

When power failure occurs on the AC power supply side of a converter in a motor control device, in the aforementioned motor control device, it is not possible to continue a normal operation of a feed shaft motor and a main shaft motor. In this case, due to collision of a feed shaft, a motor, the motor control device for driving the motor, a tool connected to the motor to be driven by the motor control device, a workpiece to be processed by the tool, a production line including the motor control device and the like may cause trouble such as damage or deformation.

In order to prevent collision of a feed shaft due to power failure on the AC power supply side, it is necessary to stop the operation of the feed shaft motor for driving the feed shaft as soon as possible. In view of the above, a power failure determination unit is provided on the AC power supply side of a rectifier to monitor the presence or absence of power failure on the AC power supply side. At the time of power failure, a deceleration command is issued to the feed shaft motor so as to stop the feed shaft motor in order to avoid the aforementioned trouble or minimize the trouble. In this way, there is performed a protection operation of protecting a main shaft being moved by a feed shaft motor, a tool connected to the motor, or a workpiece to be processed by the tool. When the power supply of a computer unit of the control device is backed up by an uninterruptible power system (UPS) or the like, even when power failure occurs on the AC power supply side, the control device is capable of issuing a command, to the feed shaft motor inverter, indicating an operation to be taken in an emergency. It is possible to operate the feed shaft motor inverter for a while by the electric charges accumulated in a capacitor provided in the converter, and thereby possible to emergency-stop the feed shaft motor.

As described in Japanese Laid-open Patent Publication No. H7-143780, as a method for emergency-stopping a motor at the time of power failure on the AC power supply side, there is proposed a method for stopping a motor at an early stage by actively generating a reverse torque in the course of decelerating the motor.

However, when applying the technology, for example, described in Japanese Laid-open Patent Publication No. H7-143780, in which a deceleration command is issued to a feed shaft motor in association with power failure detection on the AC power supply side to emergency-stop the feed shaft motor to a motor drive device having a function of regenerating regenerative electric power generated at the time of motor deceleration on the AC power supply side, it is not possible to return the regenerative electric power to the AC power supply side at the time of power failure. As a result, the DC voltage of a DC link between the converter and the inverter rises. In particular, the above drawback is noticeable when regenerative electric power of a motor is large. In view of the above, typically, an inverter issues an "overvoltage alarm" for protecting the inverter itself, when the DC voltage of the DC link at the DC side of the inverter becomes excessively large, and the control is abandoned. In this case, it is incapable of emergency-stopping the motor by actively generating a reverse torque in the course of deceleration. As a result, it takes time until the motor stops after power failure on the AC power supply side, which is a problem. When the above problem occurs in aforementioned feed shaft motor, for example, it is not possible to avoid collision of a feed shaft.

Further, there is a case that is necessary to continue to supply driving electric power from a feed shaft motor inverter to a feed shaft motor, even when the feed shaft motor is decelerated, depending on the characteristics of the feed shaft motor, or the state of friction applied to the feed shaft to be driven by the feed shaft motor. Specifically, in this case, even when the feed shaft motor is being decelerated, regenerative electric power is not generated in the feed shaft motor. Therefore, the feed shaft motor inverter does not supply energy to the DC link. Contrary to the above, the feed shaft motor inverter converts DC power of the DC link into AC power, and supplies the AC power to the feed shaft motor. When power failure occurs on the AC power supply side in this condition, and a deceleration command for an emergency-stop as described above is issued, the DC voltage of the DC link is rapidly lowered. Typically, the inverter issues an "undervoltage alarm", because an excessively low DC voltage of the DC link at the DC side of the inverter makes the inverter incapable of supplying electric power for driving. Thus, the control is abandoned. In this case, it is incapable of emergency-stopping the motor by actively generating a reverse torque in the course of deceleration. As a result, it takes time until the motor stops after power failure on the AC power supply side, which is a problem. When the above problem occurs in the aforementioned feed shaft motor, for example, it is not possible to avoid collision of a feed shaft.

In order to avoid these drawbacks, a configuration may be assumed, in which the DC voltage of a DC link is monitored, and when the DC voltage rises, a main shaft motor is accelerated for energy consumption by the amount corresponding to an increase in DC power of the DC link, which is a cause for the increase in the DC voltage of the DC link, whereby the increase in the DC voltage is suppressed. On the other hand, when the DC voltage of the DC link falls, regenerative electric power to be generated by decelerating the main shaft motor is supplied for compensation by the amount corresponding to a decrease in DC power of the DC link, which is a cause for the decrease in the DC voltage of the DC link, whereby the decrease in DC power of the DC link is suppressed. When the main shaft motor is an induction motor, however, excitation current for generating a magnetic flux is generally weakened in order to suppress heat generation of the main shaft motor (induction motor), at the time of a light load. When power failure occurs on the AC power supply side in a state that the excitation current is weakened and the kinetic energy of the feed shaft is large, it is not possible to promptly control acceleration and deceleration of the main shaft motor at a maximum output. Therefore, when the main shaft motor is an induction motor, it may not be possible to suppress a sharp rise or fall in the DC voltage of the DC link at the time of power failure on the AC power supply side.

SUMMARY OF THE INVENTION

In view of the above, an object of the present invention is to provide, in a machine tool including a feed shaft motor for driving a feed shaft and a main shaft motor for driving a main shaft, a control device for the machine tool that enables to securely stop the feed shaft motor at an early stage when power failure occurs on the AC power supply side, and to suppress heat generation of the main shaft motor at the time of a normal operation.

To accomplish the above object, a control device for a machine tool including a feed shaft motor for driving a feed shaft and a main shaft motor for driving a main shaft is provided with: a determination unit determining whether an operation of the feed shaft motor satisfies a predetermined determination condition; and an excitation command unit outputting an excitation current command to output excitation current larger than excitation current instructed by a master control unit to the main shaft motor, when the determination unit determines that the predetermined determination condition is satisfied.

The predetermined determination condition may be at least one of a condition that the feed shaft is being moved in a rapid traverse mode, a condition that a speed of the feed shaft is not smaller than a predetermined value, and a condition that a sum of kinetic energies of all feed shafts is not smaller than a predetermined value.

Further, the control device for a machine tool may be further provided with: a converter mutually converting power between AC power on an AC power supply side and DC power of a DC link as a DC side; a feed shaft motor inverter connected to the DC link, and mutually converting power between DC power of the DC link and AC power which is driving electric power or regenerative electric power of the feed shaft motor; a main shaft motor inverter connected to the DC link, and mutually converting power between DC power of the DC link and AC power which is driving electric power or regenerative electric power of the main shaft motor; a power failure detection unit detecting presence or absence of power failure on the AC power supply side of the converter; a voltage detection unit detecting a DC voltage value of the DC link; a feed shaft motor deceleration command unit outputting a feed shaft motor deceleration command to control power interconversion by the feed shaft motor inverter so as to decelerate the feed shaft motor, when the power failure detection unit detects power failure; a main shaft motor acceleration/deceleration command unit outputting a main shaft motor acceleration command or a main shaft motor deceleration command to control power interconversion by the main shaft motor inverter so as to accelerate or decelerate the main shaft motor in accordance with the DC voltage value detected by the voltage detection unit, when the power failure detection unit detects power failure; and a power supply backup unit supplying driving electric power to a feed shaft motor inverter control unit for controlling power interconversion by the feed shaft motor inverter, and to a main shaft motor inverter control unit for controlling power interconversion by the main shaft motor inverter, when the power failure detection unit detects power failure. The determination unit determines whether the operation of the feed shaft motor satisfies the predetermined determination condition, irrespective of presence or absence of power failure detected by the power failure detection unit.

Further, when the power failure detection unit detects power failure, the main shaft motor acceleration/deceleration command unit may output the main shaft motor acceleration command to control power interconversion by the main shaft motor inverter so as to accelerate the main shaft motor when the DC voltage value detected by the voltage detection unit is larger than a predetermined upper limit, and output the main shaft motor deceleration command to control power interconversion by the main shaft motor inverter so as to decelerate the main shaft motor when the DC voltage value detected by the voltage detection unit is smaller than a predetermined lower limit, the predetermined lower limit being smaller than the predetermined upper limit.

Further, the control device for a machine tool may further be provided with a computer numerical control unit outputting operation commands with respect to the feed shaft and the main shaft. The determination unit and the excitation command unit may be provided in the computer numerical control unit.

Further, the control device for a machine tool may be further provided with: a main shaft motor inverter control unit controlling power interconversion by the main shaft motor inverter; and a computer numerical control unit outputting operation commands with respect to the feed shaft and the main shaft. The excitation command unit may be provided in the main shaft motor inverter control unit. The determination unit may be provided in the computer numerical control unit, and may notify the excitation command unit provided in the main shaft motor inverter control unit of a determination result as to whether the operation of the feed shaft motor satisfies the predetermined determination condition.

BRIEF DESCRIPTION OF THE DRAWINGS

The invention will be more clearly understood by referring to the accompanying drawings in which.

DETAILED DESCRIPTION

In the following, a motor control device for implementing power failure protection of a machine tool is described referring to the drawings. It should be noted, however, that the invention is not limited to the drawings or the embodiments described in the following.

Figure 1:
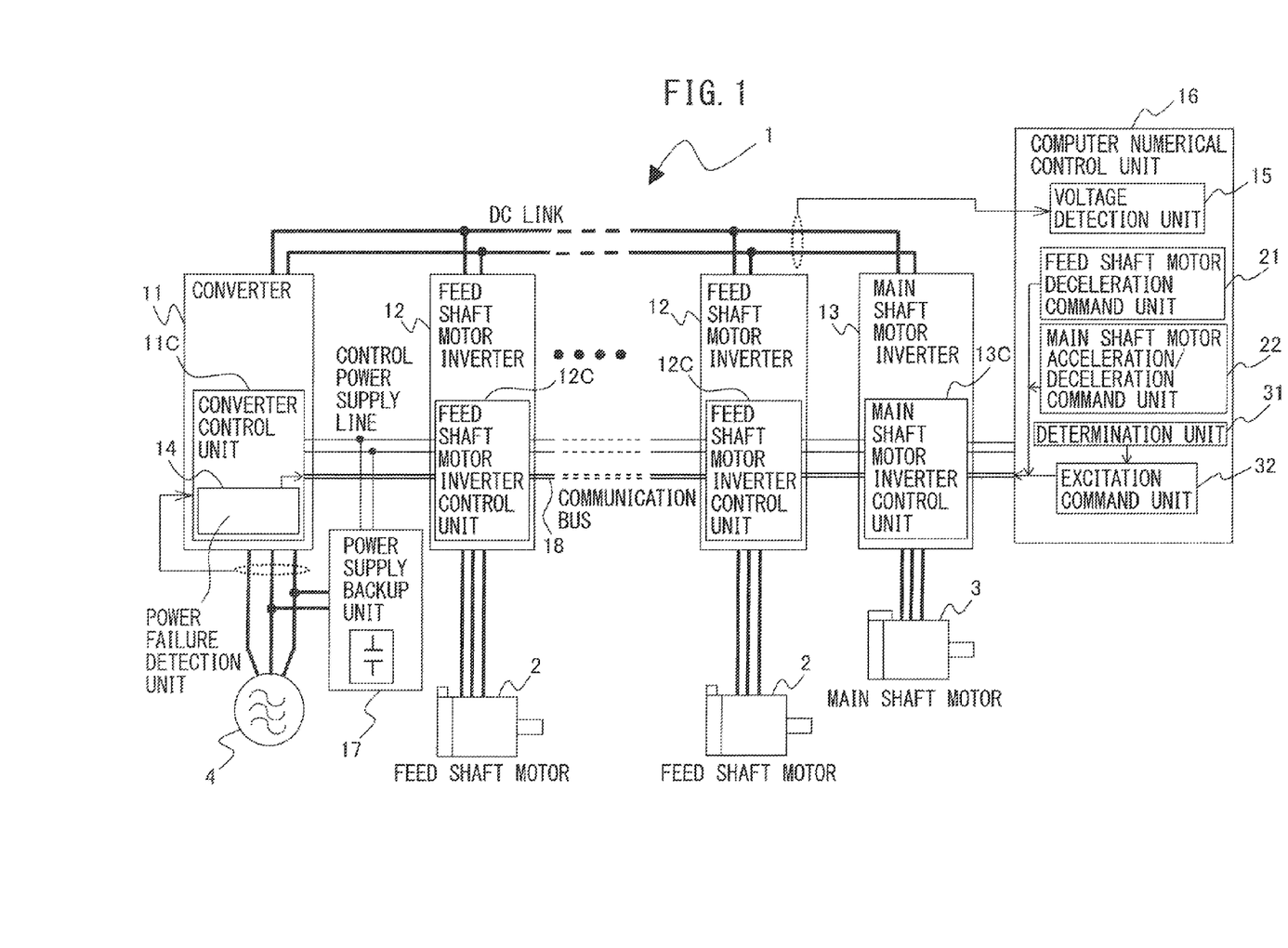
FIG. 1 is a block diagram illustrating a control device for a machine tool according to a first embodiment.

FIG. 1 is a block diagram illustrating a control device for a machine tool according to a first embodiment. Hereinafter, the elements with the same reference signs on the drawings have the same functions as each other, unless otherwise particularly mentioned. The number of illustrated feed shaft motors 2 and the number of illustrated main shaft motors 3 are merely an example, and the numbers of motors themselves do not specifically limit the invention.

According to the first embodiment, a control device 1 for a machine tool including feed shaft motors 2 for driving feed shafts, and a main shaft motor 3 for driving a main shaft is provided with a converter 11, feed shaft motor inverters 12, a main shaft motor inverter 13, a power failure detection unit 14, a voltage detection unit 15, a computer numerical control (CNC) unit 16 as a control unit, a power supply backup unit 17, a communication bus 18 as a communication unit, a feed shaft motor deceleration command unit 21, a main shaft motor acceleration/deceleration command unit 22, a determination unit 31, and an excitation command unit 32. In the first embodiment, the determination unit 31 and the excitation command unit 32 are provided in the computer numerical control unit 16.

The converter 11, the feed shaft motor inverters 12, and the main shaft motor inverter 13 are connected to each other via a DC link. Further, the communication bus 18 as a communication unit has a function of connecting a converter control unit 11C provided in the converter 11, feed shaft motor inverter control units 12C provided in the feed shaft motor inverters 12, a main shaft motor inverter control unit 13C provided in the main shaft motor inverter 13, and the computer numerical control unit 16 so as to be able to communicate with each other. In the embodiment, the communication unit is implemented by a wired system such as the communication bus 18. As an alternative, the communication unit may be implemented by a wireless system using a radio wave or an infrared ray.

The converter 11 is a rectifier capable of rectifying AC power supplied from a commercial three-phase AC power supply 4 and outputting DC power at the time of powering, and capable of returning regenerative energy regenerated by a motor on the AC power supply side via a DC link at the time of regeneration. Specifically, the converter 11 is configured to perform power interconversion between AC voltage on the commercial three-phase AC power supply side, and DC voltage of the DC link at the DC side. Examples of the converter 11 are a 120-degree energizing rectifier circuit, and a PWM controlled rectifier circuit.

The feed shaft motor inverter 12 is configured by a conversion circuit (not illustrated) provided with a switching element therein, and a feed shaft motor inverter control unit 12C for controlling the conversion circuit, such as a PWM inverter. The feed shaft motor inverter control unit 12C in the feed shaft motor inverter 12 causes the switching element in the conversion circuit to perform a switching operation, based on a motor driving command received from the computer numerical control unit 16 via the communication bus 18, and converts DC power to be supplied from the DC link side into three-phase AC power of an intended voltage and of an intended frequency for driving the feed shaft motor 2. The feed shaft motor 2 is operated based on the supplied voltage-variable and frequency-variable three-phase AC power. Further, the feed shaft motor inverter control unit 12C causes the switching element in the conversion circuit to perform a switching operation, based on a motor driving command received from the computer numerical control unit 16 via the communication bus 18, converts AC power that is regenerative electric power generated at the time of decelerating the feed shaft motor 2 into DC power, and returns the DC power to the DC link. In this way, the feed shaft motor inverter 12 performs power interconversion between DC power of the DC link, and AC power that is driving electric power or regenerative electric power of the feed shaft motor 2.

The main shaft motor inverter 13 is configured by a conversion circuit (not illustrated) provided with a switching element therein, and a main shaft motor inverter control unit 13C for controlling the conversion circuit, such as a PWM inverter. The main shaft motor inverter control unit 13C in the main shaft motor inverter 13 causes the switching element in the conversion circuit to perform a switching operation, based on a motor driving command received from the computer numerical control unit 16 via the communication bus 18, and converts DC power to be supplied from the DC link side into three-phase AC power of an intended voltage and of an intended frequency for driving the main shaft motor 3. The main shaft motor 3 is operated based on the supplied voltage-variable and frequency-variable three-phase AC power. Further, the main shaft motor inverter control unit 13C causes the switching element in the conversion circuit to perform a switching operation, based on a motor driving command received from the computer numerical control unit 16 via the communication bus 18, converts AC power that is regenerative electric power generated at the time of decelerating the main shaft motor 3 into DC power, and returns the DC power to the DC link. In this way, the main shaft motor inverter 13 performs power interconversion between DC power of the DC link and AC power that is driving electric power or regenerative electric power of the main shaft motor 3.

The power failure detection unit 14 is provided in the converter control unit 11C, for instance, and is configured to detect the presence or absence of power failure on the AC power supply side of the converter 11. Detection of the presence or absence of power failure by the power failure detection unit 14 may be implemented by a well-known method, with use of a variation in AC voltage value, AC current value, or AC frequency on the AC power supply side of the converter 11. The converter control unit 11C is configured to notify a detection result on the presence or absence of power failure by the power failure detection unit 14 to the feed shaft motor inverter control unit 12C, the main shaft motor inverter control unit 13C, and the computer numerical control unit 16 via the communication bus 18.

The voltage detection unit 15 is provided in the computer numerical control unit 16, and is configured to detect a DC voltage value of the DC link. As an alternative, the voltage detection unit 15 may be provided in the feed shaft motor inverter 12 or in the main shaft motor inverter 13. In the alternative, a detected DC voltage value of the DC link may be notified to the computer numerical control unit 16 via the communication bus 18.

The computer numerical control unit 16 is configured to generate and output a motor driving command for controlling the power interconversion between the feed shaft motor inverter 12 and the main shaft motor inverter 13 so as to rotate the feed shaft motor 2 and the main shaft motor 3 at an intended rotational speed or at an intended rotational torque suitable for the machine tool or to control the position of the rotor. Specifically, the computer numerical control unit 16 generates a motor driving command for each of the motors in accordance with an operation program of the machine tool, with use of feedback control (in some cases, including feed-forward control) regarding the rotational speed of the feed shaft motor 2 and the main shaft motor 3 and the position of the rotor, and with use of parameters such as various motor constants, a motor inertia, and a motor friction of the feed shaft motor 2 and the main shaft motor 3, and an inertia and a friction of the feed shaft to be driven by the feed shaft motor 2 and the main shaft to be driven by the main shaft motor 3. The generated motor driving commands are notified to the feed shaft motor inverter control unit 12C and to the main shaft motor inverter control unit 13C via the communication bus 18. The feed shaft motor inverter control unit 12C and the main shaft motor inverter control unit 13C respectively cause the switching elements in the conversion circuits of the feed shaft motor inverter 12 and the main shaft motor inverter 13 to perform switching operations in accordance with the received motor driving commands, and control the power interconversion between the feed shaft motor inverter 12 and the main shaft motor inverter 13. In this way, the computer numerical control unit 16 serves as a master control unit with respect to the feed shaft motor inverter control unit 12C and the main shaft motor inverter control unit 13C.

Further, in the first embodiment, the computer numerical control unit 16 includes the feed shaft motor deceleration command unit 21, the main shaft motor acceleration/deceleration command unit 22, the determination unit 31, and the excitation command unit 32.

In response to receiving a notification indicating power failure on the AC power supply side from the power failure detection unit 14 via the communication bus 18, the feed shaft motor deceleration command unit 21 in the computer numerical control unit 16 generates a feed shaft motor deceleration command for controlling the power interconversion by the feed shaft motor inverter 12 so as to decelerate the feed shaft motor 2. The generated feed shaft motor deceleration command is output to the feed shaft motor inverter control unit 12C via the communication bus 18. In response to receiving the feed shaft motor deceleration command, the feed shaft motor inverter control unit 12C controls the switching element in the conversion circuit of the feed shaft motor inverter 12 to generate a deceleration torque in the feed shaft motor 2. By performing the above operation, the feed shaft motor 2 is decelerated and then stopped.

In response to receiving a notification indicating power failure on the AC power supply side from the power failure detection unit 14 via the communication bus 18, the main shaft motor acceleration/deceleration command unit 22 in the computer numerical control unit 16 generates a main shaft motor acceleration command or a main shaft motor deceleration command for controlling the power interconversion by the main shaft motor inverter 13 so as to accelerate or decelerate the main shaft motor 3 in accordance with a DC voltage value detected by the voltage detection unit 15.

More specifically, when the DC voltage value detected by the voltage detection unit 15 is larger than a predetermined upper limit, the main shaft motor acceleration/deceleration command unit 22 generates a main shaft motor acceleration command for controlling the power interconversion by the main shaft motor inverter 13 so as to accelerate the main shaft motor 3. Further, when the DC voltage value detected by the voltage detection unit 15 is smaller than a predetermined lower limit, the main shaft motor acceleration/deceleration command unit 22 generates a main shaft motor deceleration command for controlling the power interconversion by the main shaft motor inverter 13 so as to decelerate the main shaft motor 3. The predetermined lower limit is a value smaller than the predetermined upper limit. The generated main shaft motor acceleration command or main shaft motor deceleration command is output to the main shaft motor inverter control unit 13C via the communication bus 18. In response to receiving the main shaft motor deceleration command, the main shaft motor inverter control unit 13C causes the switching element in the conversion circuit of the main shaft motor inverter 13 to perform a switching operation, and controls the power interconversion by the main shaft motor inverter 13 so as to decelerate the main shaft motor 3. By performing the above operation, AC power that is the regenerative electric power generated by deceleration of the main shaft motor 3 is converted into DC power by the main shaft motor inverter 13, and the DC power is returned to the DC link. As a result, the DC voltage value of the DC link rises. Further, in response to receiving the main shaft motor acceleration command, the main shaft motor inverter control unit 13C causes the switching element in the conversion circuit of the main shaft motor inverter 13 to perform a switching operation, and controls the power interconversion by the main shaft motor inverter 13 so as to accelerate the main shaft motor 3. By performing the above operation, DC power of the DC link is converted into AC power by the main shaft motor inverter 13, and the AC power is supplied to the main shaft motor 3. As a result, the DC voltage value of the DC link falls.

As another modification, when the DC voltage notified via the communication bus 18 is not smaller than the predetermined lower limit and not larger than the predetermined upper limit, the main shaft motor acceleration/deceleration command unit 22 may generate a command to control the power interconversion by the main shaft motor inverter 13 so as to maintain the current speed, and may output the command to the main shaft motor inverter control unit 13C via the communication bus 18. In the modification, the control is performed to keep the speed of the main shaft, as far as the DC voltage does not rise or fall.

In the first embodiment and the above-described modification, the feed shaft motor deceleration command unit 21 and the main shaft motor acceleration/deceleration command unit 22 are provided in the computer numerical control unit 16. As an alternative, the feed shaft motor deceleration command unit 21 may be provided in the feed shaft motor inverter control unit 12C, and the main shaft motor acceleration/deceleration command unit 22 may be provided in the main shaft motor inverter control unit 13C, respectively. In this alternative, in response to receiving a notification indicating power failure on the AC power supply side from the power failure detection unit 14 via the communication bus 18, the feed shaft motor deceleration command unit 21 in the feed shaft motor inverter control unit 12C generates a feed shaft motor deceleration command for controlling the power interconversion by the feed shaft motor inverter 12 so as to decelerate the feed shaft motor 2. Further, in response to receiving a notification indicating power failure on the AC power supply side from the power failure detection unit 14 via the communication bus 18, the main shaft motor acceleration/deceleration command unit 22 in the main shaft motor inverter control unit 13C generates a main shaft motor acceleration command or a main shaft motor deceleration command for controlling the power interconversion by the main shaft motor inverter 13 so as to accelerate or decelerate the main shaft motor 3 in accordance with a DC voltage value detected by the voltage detection unit 15.

The determination unit 31 in the computer numerical control unit 16 determines whether the operation of the feed shaft motor satisfies a predetermined determination condition. The predetermined determination condition is at least one of a condition that the feed shaft is being moved in a rapid traverse mode, a condition that the speed of the feed shaft is not smaller than a predetermined value, and a condition that the sum of kinetic energies of all the feed shafts is not smaller than a predetermined value. The details of the determination condition will be described later along with the excitation command unit 32.

When the determination unit 31 determines that at least one of the predetermined determination conditions is satisfied, the excitation command unit 32 in the computer numerical control unit 16 outputs, to the main shaft motor inverter control unit 13C via the communication bus 18, an excitation current command to output, to the main shaft motor 3, excitation current larger than the excitation current instructed by the master control unit.

Next, the determination conditions to be used in a determination process by the determination unit 31, and an operation of the excitation command unit 32 are described. When at least one of a condition that the feed shaft is being moved in the rapid traverse mode, a condition that the speed of the feed shaft is not smaller than a predetermined value, and a condition that the sum of kinetic energies of all the feed shafts is not smaller than a predetermined value is established, the excitation command unit 32 generates an excitation current command as follows.

The following description is a case, in which "whether the feed shaft is being moved in the rapid traverse mode" is used as the determination condition to be used in the determination process by the determination unit 31. When a machine tool is a cutting machine, in a cutting process, for instance, a blade mounted on the main shaft which is driven and rotated by the main shaft motor 3 is adjusted to be positioned at an appropriate processing point suitable for a workpiece mounted on the feed shaft as necessary by rotating the feed shaft motor 2. Thus, an intended cutting process is performed. On the other hand, when a cutting process is not performed, it is not necessary to position the blade at an appropriate processing point suitable for the workpiece. For instance, the feed shaft may be moved in rapid traverse by the feed shaft motor 2 in order to prepare for a next cutting process or in order to take out the processed workpiece. In the specification of the present application, the mode at which the feed shaft is moved in rapid traverses when a cutting process is not performed, as described above, is referred to as "rapid traverse mode". The kinetic energy of the feed shaft being moved in the rapid traverse mode is large, as compared with the kinetic energy when a cutting process is performed. Therefore, if power failure occurs on the AC power supply side when the feed shaft is being moved in the rapid traverse mode, the feed shaft motor 2 is rapidly decelerated by the feed shaft motor deceleration command to be output from the feed shaft motor deceleration unit 21 as described above. As a result, large regenerative energy is generated in the feed shaft motor 2. The generated regenerative energy is converted into DC power by the feed shaft motor inverter 12, and the DC power is returned to the DC link. When the above state is left as it is, the DC voltage value of the DC link is increased. Further, in the rapid traverse mode (when a cutting process is not performed), the blade mounted on the main shaft is away from the workpiece mounted on the feed shaft. Therefore, the main shaft motor 3 is in a light load state, as compared with the state when a cutting process is performed. According to the conventional art, the excitation current is weakened in order to suppress heat generation of the main shaft motor 3 as an induction motor at the time of such a light load operation. If power failure occurs on the AC power supply side during the light load operation, it takes time to obtain sufficient excitation current, even when the excitation current is made to be increased in order to rapidly accelerate the main shaft motor 3 after power failure detection. Consequently, it is not possible to promptly consume the regenerative energy generated in the feed shaft to suppress a rise in the DC voltage of the DC link.

Contrary to the above, in the first embodiment, when the determination unit 31 determines that the feed shaft is being moved in the rapid traverse mode, the excitation command unit 32 outputs, to the main shaft motor inverter control unit 13C via the communication bus 18, an excitation current command to output excitation current larger than the excitation current instructed by the master control unit (i.e., the computer numerical control unit 16) to the main shaft motor 3, irrespective of the presence or absence of power failure. By operating the main shaft motor 3 with excitation current larger than the excitation current instructed by the master control unit, it is possible to promptly consume the regenerative energy generated at the time of power failure on the AC power supply side when the feed shaft is being moved in the rapid traverse mode by rapidly accelerating the main shaft motor 3. By performing the above operation, even if power failure occurs on the AC power supply side when the feed shaft is being moved in the rapid traverse mode, it is possible to suppress a rise in the DC voltage value of the DC link. Further, during a cutting operation by a machine tool, generally, the speed of the feed shaft is slow, and the kinetic energy is not so large. In the embodiment, the magnitude of excitation current is optimized in accordance with the load exerted on the main shaft during a cutting operation so as to reduce heat generation. Increasing the excitation current applied to the main shaft motor may result in an increase in the amount of heat generation of the main shaft motor. However, the frequency of occurrence of rapid traverse mode is not so high during a processing cycle in a machine tool, and an increase in the amount of heat generation is small. Therefore, it is possible to securely stop the feed shaft motor at an early stage of power failure on the AC power supply side, and it is possible to suppress heat generation of the main shaft motor at the time of normal operation (when a cutting operation is performed).

In the rapid traverse mode (when a cutting operation is not performed), the determination unit 31 constantly executes a determination process as to whether the feed shaft is being moved in the rapid traverse mode in order to cope with power failure on the AC power supply side at any time. The computer numerical control unit 16 constantly senses whether or not a cutting process is being performed by the machine tool. Therefore, the determination unit 31 provided in the computer numerical control unit 16 determines "whether the feed shaft is being moved in the rapid traverse mode" based on information relating to the control mode.

Further, the following description is a case, in which "whether the speed of the feed shaft is not smaller than a predetermined value" is used as the determination condition to be used in the determination process by the determination unit 31. When the feed shaft is being moved in the rapid traverse mode, the speed of the feed shaft is fast, as compared with the speed when a cutting process is performed. Therefore, using "whether the speed of the feed shaft is not smaller than a predetermined value" as the determination condition also makes it possible to obtain substantially the same advantageous effects as the case of using above-described "whether the feed shaft is being moved in the rapid traverse mode" as the determination condition. The computer numerical control unit 16 constantly controls the speed of the feed shaft via a speed detector. Therefore, the determination unit 31 in the computer numerical control unit 16 determines "whether the speed of the feed shaft is not smaller than a predetermined value", based on the speed information.

Further, the following description is a case, in which "whether the sum of kinetic energies of all the feed shafts is not smaller than a predetermined value" is used as the determination condition to be used in the determination process by the determination unit 31. When the kinetic energy of the entire feed shafts is large, the regenerative energy generated when it is attempted to rapidly stop the feed shafts at the time of power failure is also large. If the load inertia of each of the feed shafts is known in advance, it is possible to calculate the kinetic energy of each of the feed shafts and to calculate the sum of the kinetic energies, with use of information relating to the speed and the load inertia. In other words, assuming that W is a kinetic energy, I is a load inertia, and ω is an angular velocity, the kinetic energy W is expressed by: "$W=(1/2) \times I \times \omega^2$". Therefore, preparing for power failure with use of "whether the sum of kinetic energies of all the feed shafts is not smaller than a predetermined value" as the determination condition makes it possible to obtain substantially the same advantageous effects as the case of using "whether the feed shaft is being moved in the rapid traverse mode" as the determination condition. The computer numerical control unit 16 constantly controls the speeds of the feed shafts via a speed detector.

Therefore, the computer numerical control unit 16 calculates the sum of kinetic energies of the feed shafts, with use of the speed information and the load inertia of each feed shaft. The determination unit 31 in the computer numerical control unit 16 determines "whether the sum of kinetic energies of all the feed shafts is not smaller than a predetermined value", based on information relating to the kinetic energy.

Next, the power supply backup unit 17 is described.

At the time of normal operation, the feed shaft motor inverter control unit 12C, the main shaft motor inverter control unit 13C, and the computer numerical control unit 16 receive electric power supply for operations thereof from the commercial three-phase AC power supply 4 of the converter 11 through a control power supply line. However, when power failure occurs on the AC power supply side of the converter 11, it becomes incapable of receiving the electric power supply. Therefore, in order to implement the aforementioned operations of the feed shaft motor inverter control unit 12C, the main shaft motor inverter control unit 13C, and the computer numerical control unit 16, there is provided the power supply backup unit 17 for supplying electric power for operating the computer numerical control unit 16 to the feed shaft motor inverter control unit 12C, the main shaft motor inverter control unit 13C, and the computer numerical control unit 16, even when power failure is detected by the power failure detection unit 14. The power supply backup unit 17 is configured by, for instance, a capacitor or an electrical storage device for storing DC power obtained by rectifying AC power on the AC power supply side. The power supply backup unit 17 is constantly charged at an appropriate voltage, and is configured to supply electric power to the feed shaft motor inverter control unit 12C, the main shaft motor inverter control unit 13C, and the computer numerical control unit 16 via the control power supply line at the time of power failure on the AC power supply side.

Figure 2:
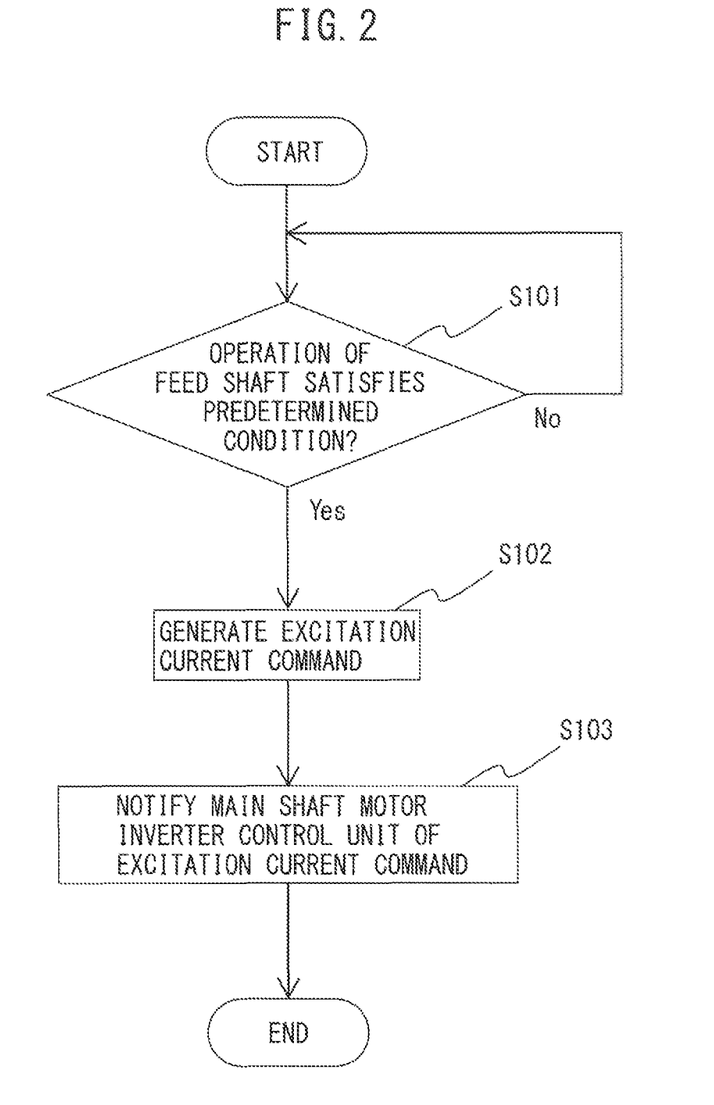
FIG. 2 is a flowchart illustrating a process of generating an excitation current command in the control device for the machine tool according to the first embodiment.

FIG. 2 is a flowchart illustrating a process of generating an excitation current command in the control device for a machine tool according to the first embodiment.

In Step S101, the determination unit 31 in the computer numerical control unit 16 determines whether the operation of the feed shaft motor satisfies a predetermined determination condition. The predetermined determination condition is at least one of a condition that the feed shaft is being moved in the rapid traverse mode, a condition that the speed of the feed shaft is not smaller than a predetermined value, and a condition that the sum of kinetic energies of all the feed shafts is not smaller than a predetermined value. When it is determined that the predetermined determination condition is satisfied in Step S101, the process proceeds to Step S102. Note that when "the sum of kinetic energies of all the feed shafts is not smaller than a predetermined value" is used as the determination condition to be used in the determination process by the determination unit 31, the sum of kinetic energies of the feed shafts is calculated in the computer numerical control unit 16, with use of information relating to the speed and the load inertia, prior to execution of Step S101.

In Step S102, the excitation command unit 32 in the computer numerical control unit 16 generates an excitation current command to output excitation current larger than the excitation current instructed by the master control unit (i.e., the computer numerical control unit 16, described above) to the main shaft motor 3.

Subsequently, in Step S103, the excitation current command generated by the excitation command unit 32 in the computer numerical control unit 16 is notified to the main shaft motor inverter control unit 13C via the communication bus 18. The main shaft motor inverter control unit 13C controls the power interconversion by the main shaft motor inverter 13 so as to operate the main shaft motor 3 with excitation current larger than the excitation current instructed by the master control unit, based on the excitation current command generated by the excitation command unit 32. By performing the above operation, it is possible for the main shaft motor 3 to promptly consume the regenerative energy generated at the time of power failure on the AC power supply side when the feed shaft is being moved in the rapid traverse mode, and it is possible to suppress a rise in the DC voltage value of the DC link.

Figure 3:
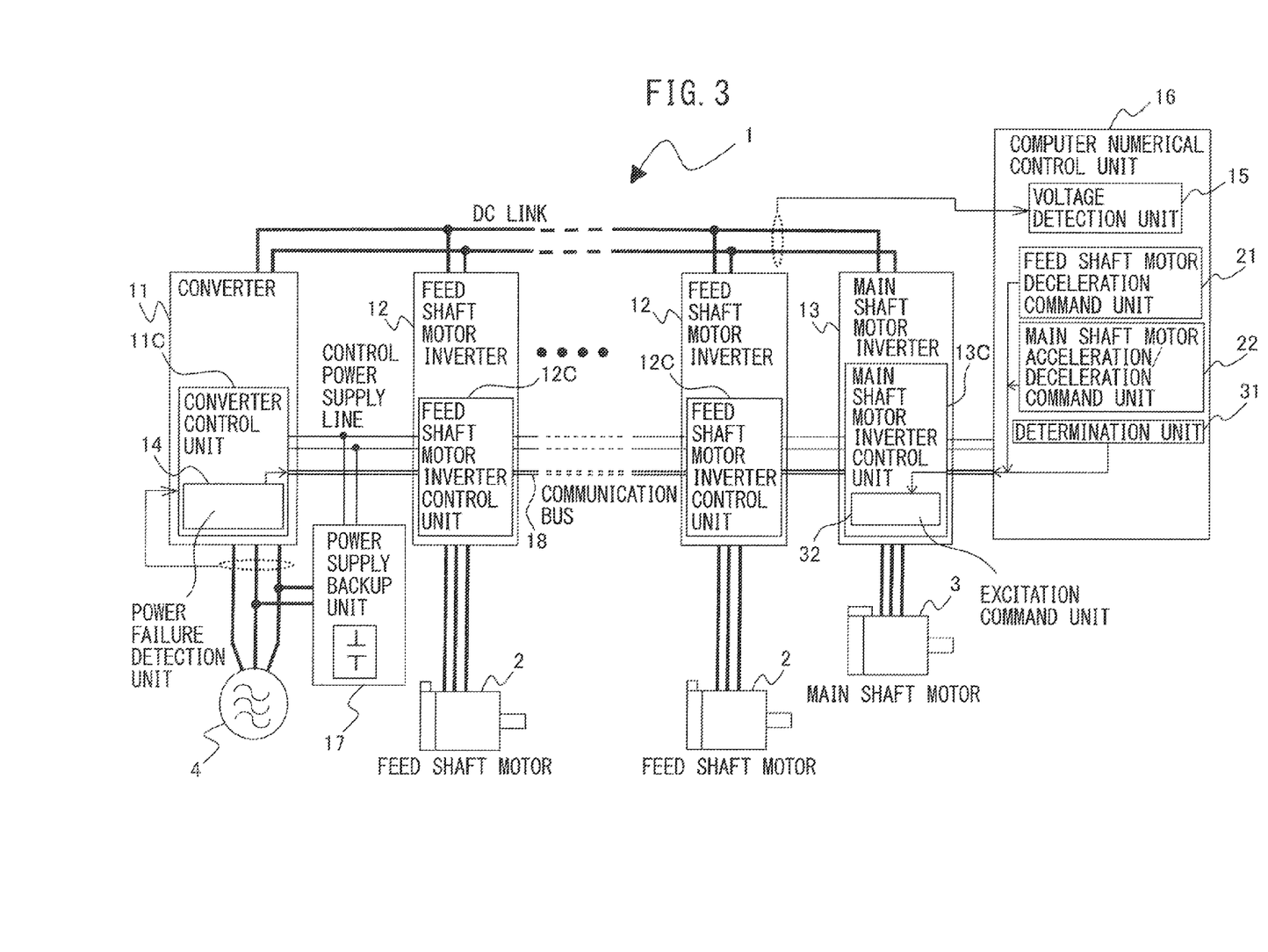
FIG. 3 is a block diagram illustrating a control device for a machine tool according to a second embodiment.

FIG. 3 is a block diagram illustrating a control device for a machine tool according to a second embodiment. In the second embodiment, an excitation command unit 32 is provided in a main shaft motor inverter control unit 13C, whereas in the first embodiment, the excitation command unit 32 is provided in the computer numerical control unit 16.

Specifically, according to the second embodiment, a determination unit 31 provided in a computer numerical control unit 16 determines whether the operation of a feed shaft motor satisfies a predetermined determination condition, and notifies the determination result to the excitation command unit 32 provided in the main shaft motor inverter control unit 13C via a communication bus 18. In response to receiving a determination result indicating that the operation of the feed shaft motor satisfies the predetermined determination condition from the determination unit 31 via the communication bus 18, the excitation command unit 32 provided in the main shaft motor inverter control unit 13C generates an excitation current command to output excitation current larger than the excitation current instructed by a master control unit (i.e., the computer numerical control unit 16) to a main shaft motor 3. The main shaft motor inverter control unit 13C controls the power interconversion by a main shaft motor inverter 13 so as to operate the main shaft motor 3 with excitation current larger than the excitation current instructed by the master control unit, based on the excitation current command generated by the excitation command unit 32. By performing the above operation, as well as the first embodiment, it is possible for the main shaft motor 3 to promptly consume the regenerative energy generated at the time of power failure on the AC power supply side when a feed shaft is being moved in the rapid traverse mode, and it is possible to suppress a rise in the DC voltage value of a DC link. The circuit constituent elements and the determination conditions to be used in the determination process by the determination unit 31 other than the above are substantially the same as those in the first embodiment described referring to FIG. 1 and FIG. 2, and therefore, a detailed description thereof is omitted herein.

Figure 4:
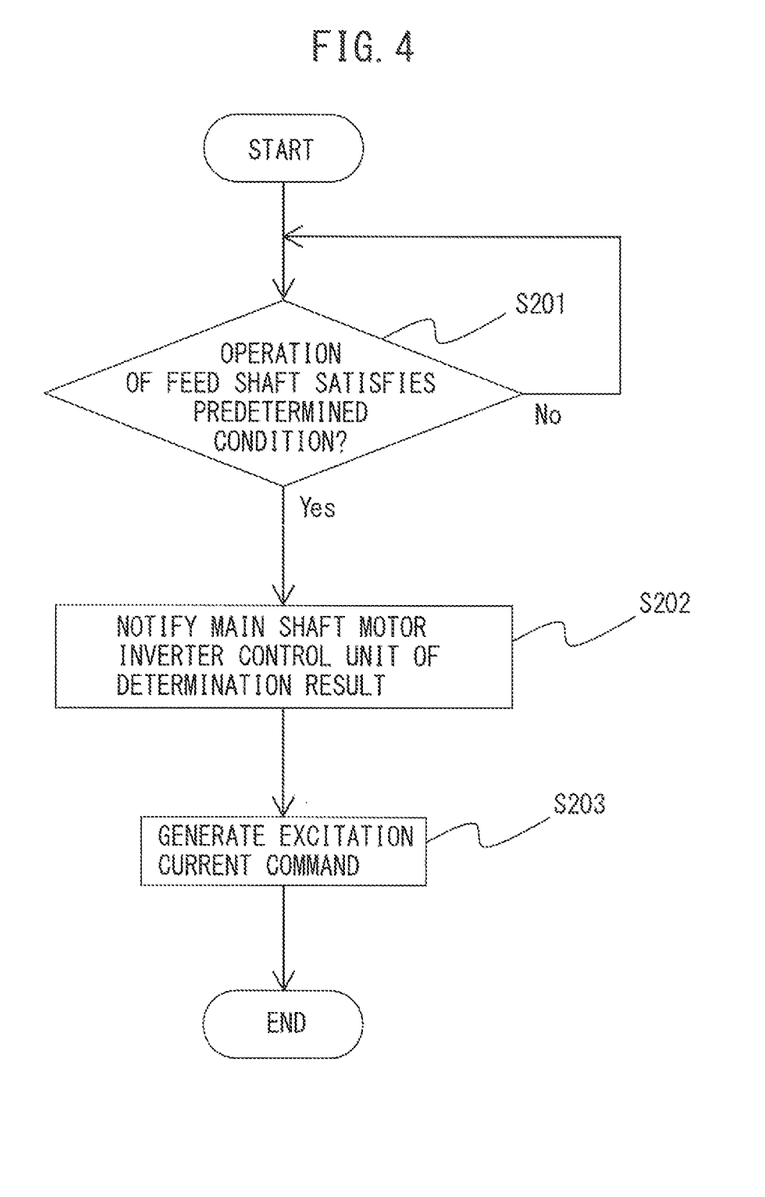
FIG. 4 is a flowchart illustrating a process of generating an excitation current command in the control device for the machine tool according to the second embodiment.

FIG. 4 is a flowchart illustrating a process of generating an excitation current command in the control device for a machine tool according to the second embodiment.

In Step S201, the determination unit 31 in the computer numerical control unit 16 determines whether the operation of the feed shaft motor satisfies a predetermined determination condition. The predetermined determination condition is at least one of a condition that the feed shaft is being moved in the rapid traverse mode, a condition that the speed of the feed shaft is not smaller than a predetermined value, and a condition that the sum of kinetic energies of all the feed shafts is not smaller than a predetermined value. When it is determined that the predetermined determination condition is satisfied in Step S201, the process proceeds to Step S202. Note that when "the sum of kinetic energies of all the feed shafts is not smaller than a predetermined value" is used as the determination condition to be used in the determination process by the determination unit 31, the sum of kinetic energies of the feed shafts is calculated in the computer numerical control unit 16, with use of information relating to the speed and the load inertia, prior to execution of Step S201.

In Step S202, the determination result indicating that the operation of the feed shaft motor satisfies the predetermined determination condition is notified from the determination unit 31 in the computer numerical control unit 16 to the excitation command unit 32 in the main shaft motor inverter control unit 13 via the communication bus 18.

In Step S203, the excitation command unit 32 provided in the main shaft motor inverter control unit 13C generates an excitation current command to output excitation current larger than the excitation current instructed by the master control unit (i.e., the computer numerical control unit 16) to the main shaft motor 3.

The main shaft motor inverter control unit 13C controls the power interconversion by the main shaft motor inverter 13 so as to operate the main shaft motor 3 with excitation current larger than the excitation current instructed by the master control unit, based on the excitation current command generated by the excitation command unit 32. By performing the above operation, as well as the first embodiment, it is possible for the main shaft motor 3 to promptly consume the regenerative energy generated at the time of power failure on the AC power supply side when the feed shaft is being moved in the rapid traverse mode, and it is possible to suppress a rise in the DC voltage value of the DC link.

Figure 5:
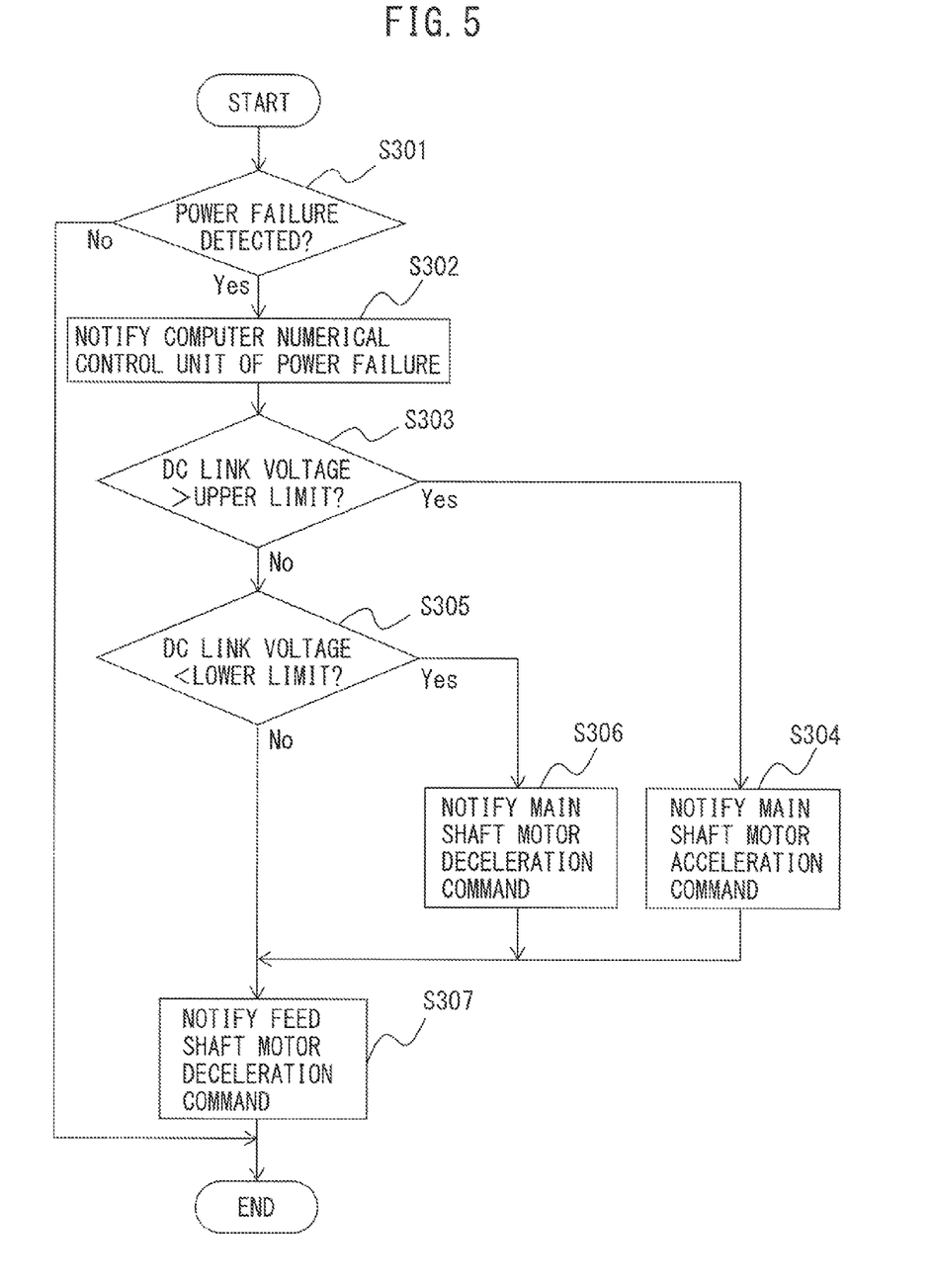
FIG. 5 is a flowchart illustrating a process of generating a feed shaft motor deceleration command, a main shaft motor acceleration command, and a main shaft motor deceleration command in the control device for a machine tool according to the first and second embodiments.

FIG. 5 is a flowchart illustrating a process of generating a feed shaft motor deceleration command, a main shaft motor acceleration command, and a main shaft motor deceleration command in the control device for a machine tool according to the first and second embodiments.

In Step S301, the power failure detection unit 14 in the converter 11 detects the presence or absence of power failure on the AC power supply side of the converter 11. When power failure is detected by the power failure detection unit 14 in Step S301, the process proceeds to Step S302.

In Step S302, the power failure detection unit 14 notifies the computer numerical control unit 16 of power failure on the AC power supply side of the converter 11 via the communication bus 18.

In Step S303, the main shaft motor acceleration/deceleration command unit 22 in the computer numerical control unit 16 determines whether the DC voltage value of the DC link notified via the communication bus 18 is larger than a predetermined upper limit. When the DC voltage value of the DC link notified via the communication bus 18 is not larger than the predetermined upper limit, the process proceeds to Step S305. When the DC voltage value of the DC link notified via the communication bus 18 is larger than the predetermined upper limit, the process proceeds to Step S304.

In Step S304, the main shaft motor acceleration/deceleration command unit 22 in the computer numerical control unit 16 generates a main shaft motor acceleration command to control the power interconversion by the main shaft motor inverter 13 so as to accelerate the main shaft motor 3. The main shaft motor acceleration command generated by the main shaft motor acceleration/deceleration command unit 22 is output to the main shaft motor inverter control unit 13C via the communication bus 18. In response to receiving the main shaft motor acceleration command, the main shaft motor inverter control unit 13C causes the switching element in the conversion circuit to perform a switching operation, and converts power into three-phase AC power of an intended voltage and of an intended frequency so as to accelerate the main shaft motor 3. The main shaft motor 3 is accelerated based on the supplied voltage-variable and frequency-variable three-phase AC power. By performing the above operation, the main shaft motor 3 is rotated at a high speed, and DC power of the DC link is consumed by the main shaft motor 3.

On the other hand, in Step S305, the main shaft motor acceleration/deceleration command unit 22 in the computer numerical control unit 16 determines whether the DC voltage value of the DC link notified via the communication bus 18 is smaller than a predetermined lower limit. When the DC voltage value of the DC link notified via the communication bus 18 is larger than the predetermined lower limit, the process proceeds to Step S307, and when the DC voltage value of the DC link notified via the communication bus 18 is not larger than the predetermined lower limit, the process proceeds to Step S306.

In Step S306, the main shaft motor acceleration/deceleration command unit 22 in the computer numerical control unit 16 generates a main shaft motor deceleration command to control the power interconversion by the main shaft motor inverter 13 so as to decelerate the main shaft motor 3. The main shaft motor deceleration command generated by the main shaft motor acceleration/deceleration command unit 22 is output to the main shaft motor inverter control unit 13C via the communication bus 18. In response to receiving the main shaft motor deceleration command, the main shaft motor inverter control unit 13C causes the switching element in the conversion circuit to perform a switching operation, and converts power into three-phase AC power of an intended voltage and of an intended frequency in order to decelerate the main shaft motor 3. The main shaft motor 3 is decelerated based on the supplied voltage-variable and frequency-variable three-phase AC power. In this case, the DC voltage value of the DC link is smaller than the predetermined lower limit at the time of power failure. Therefore, the main shaft motor 3 is decelerated to maintain the DC voltage of the DC link by the regenerated energy.

In Step S307, the feed shaft motor deceleration command unit 21 in the computer numerical control unit 16 generates a feed shaft motor deceleration command to control the power interconversion by the feed shaft motor inverter 12 so as to decelerate the feed shaft motor 2. The feed shaft motor deceleration command generated by the feed shaft motor deceleration command unit 21 is output to the feed shaft motor inverter control unit 12C via the communication bus 18. In response to receiving the feed shaft motor deceleration command, the feed shaft motor inverter control unit 12C causes the switching element in the conversion circuit to perform a switching operation, and converts power into three-phase AC power of an intended voltage and of an intended frequency in order to decelerate the feed shaft motor 2. The feed shaft motor 2 is decelerated based on the supplied voltage-variable and frequency-variable three-phase AC power.

After completion of the process of Step S307, the process returns to the process of Step S301. Specifically, by repeatedly executing the processes of Step S301 to Step S307, the computer numerical control unit 16 outputs a feed shaft motor deceleration command, along with a main shaft motor deceleration command or a main shaft motor acceleration command in accordance with a comparison result between the DC voltage of the DC link notified via the communication bus 18, and the predetermined upper limit and the predetermined lower limit.

The process of Step S307 by the feed shaft motor deceleration command unit 21, and a series of processes from Step S303 to Step S306 by the main shaft motor acceleration/deceleration command unit 22 may be interchangeably executed.

The processes of generating an excitation current command described referring to FIG. 2 and FIG. 4 are executed, irrespective of the presence or absence of power failure. Therefore, if power failure occurs on the AC power supply side at the time when the excitation command unit 32 generates an excitation current command based on a determination made by the determination unit 31 that the operation of the feed shaft satisfies the predetermined determination condition, the control device executes the process of generating the feed shaft motor deceleration command, the main shaft motor acceleration command, and the main shaft motor deceleration command as described referring to FIG. 5. By performing the above operation, it is possible for the main shaft motor 3 to promptly consume the regenerative energy generated at the time of power failure on the AC power supply side when the operation of the feed shaft satisfies the predetermined determination condition, and it is possible to suppress a rise in the DC voltage value of the DC link.

The present invention is applicable to a control device for a machine tool including a feed shaft motor for driving a feed shaft and a main shaft motor for driving a main shaft, and configured such that AC power supplied from the AC power supply side is converted into DC power to be output, and the DC power is further converted into AC power for motor driving so as to supply the AC power to the feed shaft motor and to the main shaft motor for driving.

According to the invention, in a machine tool including a feed shaft motor for driving a feed shaft and a main shaft motor for driving a main shaft, it is possible to securely stop the feed shaft motor at an early stage at the time of power failure on the AC power supply side. Therefore, it is possible to avoid collision of a feed shaft at the time of power failure on the AC power supply side. Further, it is possible to suppress heat generation of the main shaft motor. Specifically, when the operation of the feed shaft satisfies a determination condition defined by at least one of a condition that the feed shaft is being moved in the rapid traverse mode, a condition that the speed of the feed shaft is not smaller than a predetermined value, and a condition that the sum of kinetic energies of all the feed shafts is not smaller than a predetermined value, it is possible to issue a command to output excitation current larger than excitation current instructed by the master control unit (i.e., the computer numerical control unit) to the main shaft motor. Therefore, even if power failure occurs on the AC power supply side when the predetermined condition is satisfied, it is possible to securely stop the feed shaft motor at an early stage, and it is possible to suppress heat generation of the main shaft motor at the time of normal operation.

What is claimed is:

1. A control device for a machine tool including a feed shaft motor for driving a feed shaft and a main shaft motor for driving a main shaft, the control device comprising:
   a converter mutually converting power between AC power on an AC power supply side and DC power of a DC link at a DC side;
   a feed shaft motor inverter connected to the DC link, and mutually converting power between DC power of the DC link and AC power which is driving electric power or regenerative electric power of the feed shaft motor;
   a main shaft motor inverter connected to the DC link, and mutually converting power between DC power of the DC link and AC power which is driving electric power or regenerative electric power of the main shaft motor;
   a power failure detection unit detecting presence or absence of power failure on the AC power supply side of the converter;
   a feed shaft motor deceleration command unit outputting a feed shaft motor deceleration command to control power interconversion by the feed shaft motor inverter so as to decelerate the feed shaft motor, when the power failure detection unit detects power failure;
   a determination unit determining whether an operation of the feed shaft motor satisfies a predetermined determination condition; and
   an excitation command unit outputting an excitation current command to output excitation current larger than excitation current instructed by a master control unit from the main shaft motor inverter to the main shaft motor, when the determination unit determines that the predetermined determination condition is satisfied, wherein the predetermined determination condition is at least one of a condition in which the feed shaft is being moved in a rapid traverse mode, a condition in which a speed of the feed shaft is not smaller than a predetermined value, and a condition in which a sum of kinetic energies of all feed shafts is not smaller than a predetermined value.

2. The control device for a machine tool according to claim 1, further comprising:

a voltage detection unit detecting a DC voltage value of the DC link;

a main shaft motor acceleration/deceleration command unit outputting a main shaft motor acceleration command or a main shaft motor deceleration command to control power interconversion by the main shaft motor inverter so as to accelerate or decelerate the main shaft motor in accordance with the DC voltage value detected by the voltage detection unit, when the power failure detection unit detects power failure; and a power supply backup unit supplying driving electric power to a feed shaft motor inverter control unit for controlling power interconversion by the feed shaft motor inverter, and to a main shaft motor inverter control unit for controlling power interconversion by the main shaft motor inverter, when the power failure detection unit detects power failure, wherein the determination unit determines whether the operation of the feed shaft motor satisfies the predetermined determination condition, irrespective of presence or absence of power failure detected by the power failure detection unit.

3. The control device for a machine tool according to claim 2, wherein when the power failure detection unit detects power failure, the main shaft motor acceleration/deceleration command unit:

outputs the main shaft motor acceleration command to control power interconversion by the main shaft motor inverter so as to accelerate the main shaft motor when a DC voltage value detected by the voltage detection unit is larger than the predetermined upper limit; and outputs the main shaft motor deceleration command to control power interconversion by the main shaft motor inverter so as to decelerate the main shaft motor when the DC voltage value detected by the voltage detection unit is smaller than a predetermined lower limit, the predetermined lower limit being smaller than the predetermined upper limit.

4. The control device for a machine tool according to claim 1, further comprising:

a computer numerical control unit outputting operation commands with respect to the feed shaft and the main shaft, wherein the determination unit and the excitation command unit are provided in the computer numerical control unit.

5. The control device for a machine tool according to claim 2, further comprising:

a main shaft motor inverter control unit controlling power interconversion by the main shaft motor inverter; and a computer numerical control unit outputting operation commands with respect to the feed shaft and the main shaft, wherein the excitation command unit is provided in the main shaft motor inverter control unit, and the determination unit is provided in the computer numerical control unit, and is notifies the excitation command unit provided in the main shaft motor inverter control unit of a determination result as to whether the operation of the feed shaft motor satisfies the predetermined determination condition.

* * * * *